United States Patent
Kobayashi et al.

(10) Patent No.: US 8,291,443 B2
(45) Date of Patent: Oct. 16, 2012

(54) RECORDING MEDIUM CARTRIDGE

(75) Inventors: Daiki Kobayashi, Miyagi (JP); Isao Watanabe, Miyagi (JP); Yasuyuki Abe, Miyagi (JP)

(73) Assignee: Sony Corporation, Tokyo (JP)

( * ) Notice: Subject to any disclaimer, the term of this patent is extended or adjusted under 35 U.S.C. 154(b) by 247 days.

(21) Appl. No.: 12/867,454

(22) PCT Filed: Feb. 10, 2009

(86) PCT No.: PCT/JP2009/052203
§ 371 (c)(1),
(2), (4) Date: Aug. 12, 2010

(87) PCT Pub. No.: WO2009/107481
PCT Pub. Date: Sep. 3, 2009

(65) Prior Publication Data
US 2010/0314269 A1 Dec. 16, 2010

(30) Foreign Application Priority Data
Feb. 29, 2008 (JP) ................. P2008-051193

(51) Int. Cl.
*G11B 23/03* (2006.01)
(52) U.S. Cl. .................. 720/729; 360/133
(58) Field of Classification Search .......... 720/719, 720/725, 728, 729; 360/133
See application file for complete search history.

(56) References Cited

U.S. PATENT DOCUMENTS

| 6,772,430 | B2 * | 8/2004 | Oishi et al. | 720/729 |
| 6,874,159 | B2 * | 3/2005 | Inoue | 720/728 |
| 7,000,240 | B2 * | 2/2006 | Inoue | 720/741 |
| 7,295,403 | B2 * | 11/2007 | Kubozuka | 360/133 |
| 7,673,311 | B2 * | 3/2010 | Okazawa et al. | 720/738 |
| 2005/0168872 | A1 | 8/2005 | Kubozuka | |

FOREIGN PATENT DOCUMENTS

| JP | 2005-196814 | 7/2005 |
| JP | 2007-048405 | 2/2007 |
| JP | 2007-095206 | 4/2007 |
| JP | 4085978 | 2/2008 |

OTHER PUBLICATIONS

International Search Report dated May 8, 2009, for corresponding Patent Application PCT/JP2009/052203.
Japanese Office Action issued on Aug. 3, 2010 corresponding to Japanese Patent Appln. No. 2008-051193.

* cited by examiner

*Primary Examiner* — Angel A. Castro
(74) *Attorney, Agent, or Firm* — K&L Gates LLP

(57) ABSTRACT

A disk cartridge includes, between a recordable position and an unrecordable position, a first guide surface that gradually increases an elastic force of an elastic arm of a tab member and a second guide surface that gradually decreases the elastic force of the elastic arm, and a guide wall (guide portion) on which the guide surfaces are formed continuously.

7 Claims, 17 Drawing Sheets

(A)

(B)

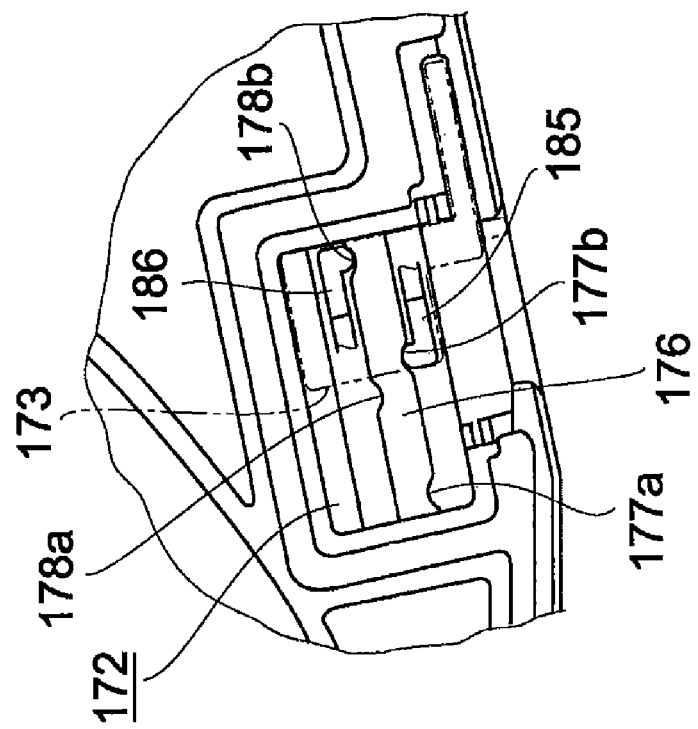
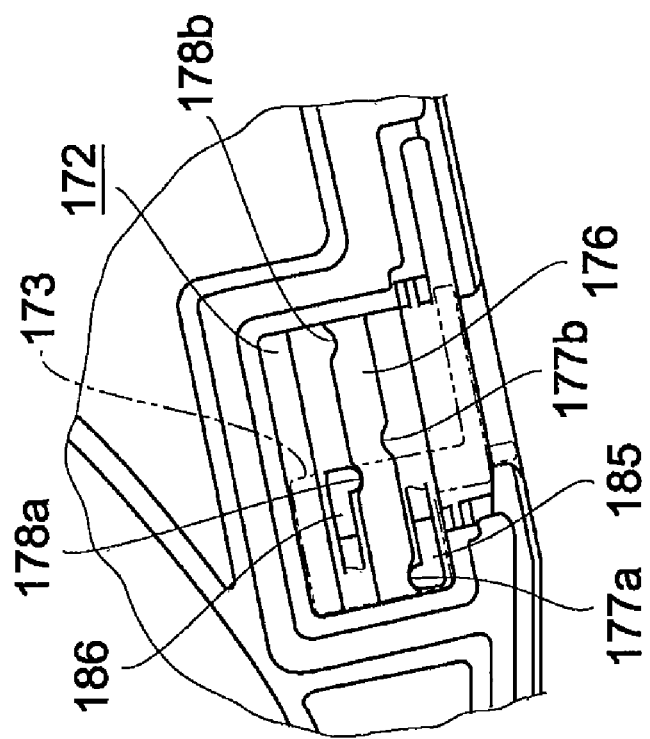
FIG.17

RECORDING MEDIUM CARTRIDGE

CROSS REFERENCE TO RELATED APPLICATIONS

The present application is a National Stage of International Application No. PCT/JP2009/052203 filed on Feb. 10, 2009 and which claims priority to Japanese Patent Application No. 2008-051193 filed on Feb. 29, 2008, the entire contents of which are being incorporated herein by reference.

BACKGROUND

The present disclosure relates to a recording medium cartridge with an improved reliability on an unintentional deletion prevention mechanism. In recent years, a disk cartridge that rotatably accommodates a disk-like recording medium such as an optical disc, a magneto optical disc, and a magnetic disk is widely used. In general, a disk cartridge is capable of recording and/or reproducing information signals including music signals, video signals, and programs. As such a disk-like recording medium capable of recording information signals, there are known, for example, a writable write-once disc and a rewritable disc with which rewrite is possible.

The disk cartridge of this type includes an unintentional deletion prevention mechanism for setting whether information can be recorded onto the disk-like recording medium. Patent Document 1 discloses, for example, a structure of an unintentional deletion prevention mechanism including an erroneous deletion preventing member that is slidable with respect to a cartridge main body and a detection hole formed on the cartridge main body.

The erroneous deletion preventing member selectively takes a recordable position at which information can be recorded onto a disk-like recording medium and an unrecordable position at which information cannot be recorded onto the disk-like recording medium. The detection hole is opened and closed in accordance with a movement of the erroneous deletion preventing member between the recordable position and the unrecordable position. Opened and closed states of the detection hole are detected by a drive apparatus (recording/reproducing apparatus) into which the disk cartridge is loaded. As a result, it becomes possible to prevent information from being recorded unintentionally onto the disk-like recording medium or information recorded onto the disk-like recording medium from being deleted unintentionally at a time the erroneous deletion preventing member is at the unrecordable position.

The erroneous deletion preventing member moves along a guide wall formed inside the cartridge main body. The erroneous deletion preventing member includes an elastic engagement part that elastically comes into contact with a side surface of the guide wall. On the side surface of the guide wall, a recording permission engagement recess and a recording inhibition engagement recess that engage with the elastic engagement part at a time the erroneous deletion preventing member is at the recordable position and the unrecordable position, respectively, are formed. Between the recording permission engagement recess and the recording inhibition engagement recess is a flat linear surface.

Patent Document 1: Japanese Patent Application Laid-open No. 2007-95206 (paragraphs [0045] to [0051], FIGS. 13 to 16)

In the unintentional deletion prevention mechanism of the related art described above, the guide wall that guides the movement of the erroneous deletion preventing member has a flat linear surface between the recording permission engagement recess and the recording inhibition engagement recess. Therefore, there is an inconvenience that, when the elastic engagement part of the erroneous deletion preventing member is stopped between the recording permission engagement recess and the recording inhibition engagement recess, the erroneous deletion preventing member is detected as being at the recordable position or at the unrecordable position depending on an opening level of the detection hole, with the result that detection accuracy on whether recording is possible is significantly lowered.

In particular, there is a case where, due to an unintentional drop of the disk cartridge, the erroneous deletion preventing member is moved by the drop impact and stops between the recordable position and the unrecordable position. In this case, the inconvenience described above is apt to occur, and a reliability of the unintentional deletion prevention mechanism cannot be secured.

In view of the circumstances as described above, it is desired to provide a recording medium cartridge that is capable of securing a reliability of an unintentional deletion prevention mechanism.

SUMMARY

According to an embodiment, there is provided a recording medium cartridge including a cartridge case, a recording medium, a tab member, and a guide portion.

The recording medium is accommodated inside the cartridge case. The tab member is movable between a recordable position at which information can be recorded onto the recording medium and an unrecordable position at which the information cannot be recorded and includes an elastic arm that elastically comes into contact with the cartridge case. The guide portion is formed on the cartridge case. The guide portion includes a first guide surface that gradually increases an elastic force of the elastic arm in accordance with a movement of the tab member between the recordable position and the unrecordable position and a second guide surface that gradually decreases the elastic force of the elastic arm. The first guide surface and the second guide surface are formed continuously.

In the recording medium cartridge, the guide portion includes, between the recordable position and the unrecordable position, the first guide surface that gradually increases the elastic force of the elastic arm of the tab member and the second guide surface that gradually decreases the elastic force of the elastic arm, the first guide surface and the second guide surface being formed continuously. Therefore, while moving from the recordable position (or unrecordable position) to the unrecordable position (or recordable position), the tab member receives a force that pushes it back toward the recordable position (or unrecordable position) as its original position when passing the first guide surface by resilience of the elastic arm. Moreover, the tab member receives a force that pushes it toward the unrecordable position (or recordable position) as a movement destination when passing the second guide surface.

According to the recording medium cartridge, even when the tab member is moved relative to the cartridge case by an external force such as a drop impact acting on the cartridge, for example, the tab member can be brought back to the recordable position or the unrecordable position by an operation of the first and second guide surfaces. In addition, the tab member can be prevented from stopping at a position between the recordable position and the unrecordable position. Thus, detection accuracy on whether recording is possible is not impaired. As a result, a reliability of an unintentional deletion prevention mechanism of the cartridge can be secured.

In the recording medium cartridge, the elastic arm may include, at a tip end portion thereof, a convex engagement portion that comes into contact with the guide portion. The guide portion may include a first concave engagement portion that engages with the convex engagement portion at a time the tab member is at the recordable position and a second concave engagement portion that engages with the convex engagement portion at a time the tab member is at the unrecordable position. With this structure, the tab member can be positioned stably at the recordable position and the unrecordable position.

Furthermore, in the recording medium cartridge, the first guide surface and the second guide surface may each be a tilted linear surface. The elastic arm may extend substantially parallel to the first guide surface. With this structure, the elastic arm extends while tilting toward the guide portion with respect to a slide direction of the tab member in an initial state. Consequently, it becomes possible to reduce an overhanging amount of the elastic arm in a direction vertical to the movement direction of the tab member at a time the elastic arm is elastically deformed. As a result, an accommodation area of the tab member with respect to the cartridge case can be made compact, and a degree of freedom in design can be improved.

Examples of the recording medium include, in addition to a disk-like recording medium such as an optical disc, a magneto optical disc, and a magnetic disk, a tape-like recording medium typified by a magnetic tape and a semiconductor memory. Therefore, the recording medium cartridge is categorized into a disk cartridge, a tape cartridge, and the like depending on a type of recording medium.

As described above, according to the recording medium cartridge of the embodiment, a positioning function of a tab member at a recordable position or an unrecordable position can be improved, and a reliability of an unintentional deletion prevention mechanism can therefore be secured.

Additional features and advantages are described herein, and will be apparent from, the following Detailed Description and the figures.

BRIEF DESCRIPTION OF THE FIGURES

FIGS. 15 Plan views of the tab member accommodated in the tab accommodation portion, in which FIG. 15(A) shows a recordable position, and FIG. 15(B) shows an unrecordable position.

FIGS. 16 Plan views each showing a relationship between a guide wall formed in the tab accommodation portion and an elastic arm of the tab member, in which FIG. 16(A) shows the recordable position, and FIG. 16(B) shows the unrecordable position.

FIGS. 17 Plan views each showing main portions of the structures of the guide wall and the elastic arm of the tab member in an unintentional deletion prevention mechanism according to a comparative example, in which FIG. 17(A) shows the recordable position, and FIG. 17(B) shows the unrecordable position.

DETAILED DESCRIPTION

Hereinafter, an embodiment will be described with reference to the drawings. In this embodiment, a disk cartridge will be exemplified as a recording medium cartridge.

Figure 1:
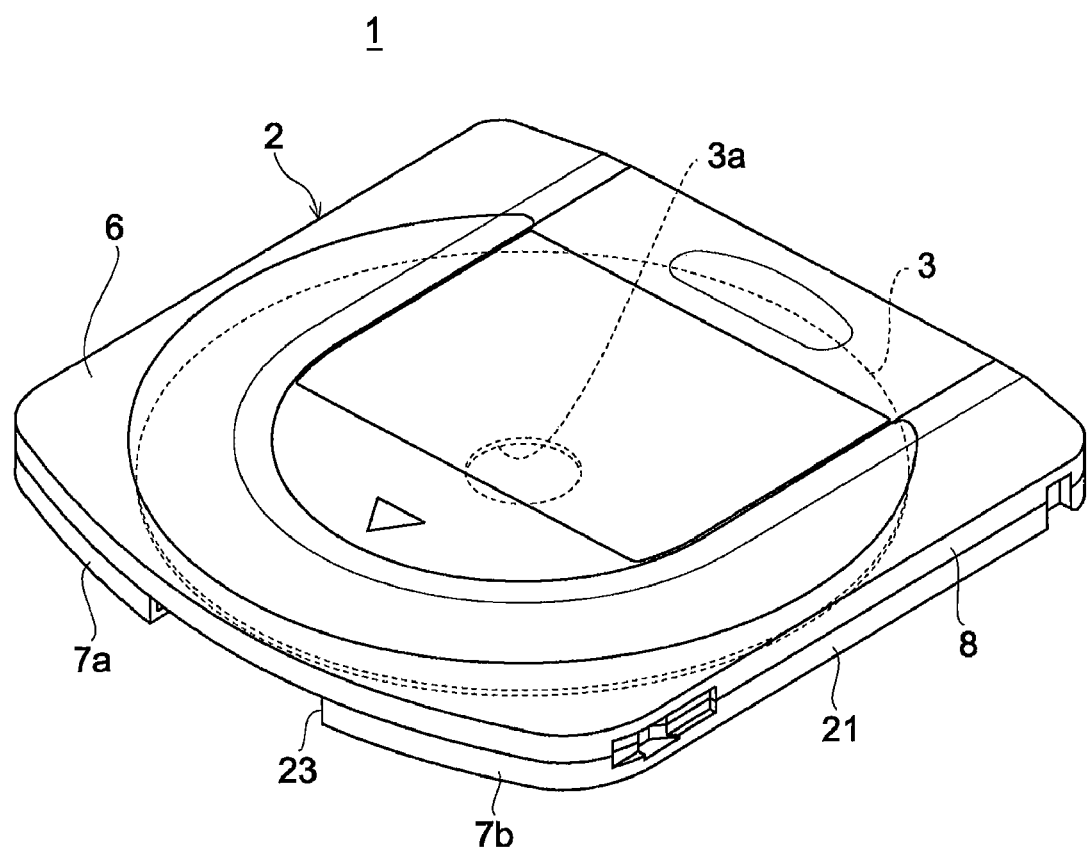
FIG. 1 A perspective view of a disk cartridge as a recording medium cartridge according to an embodiment of the present invention seen from an upper shell side.
Figure 2:
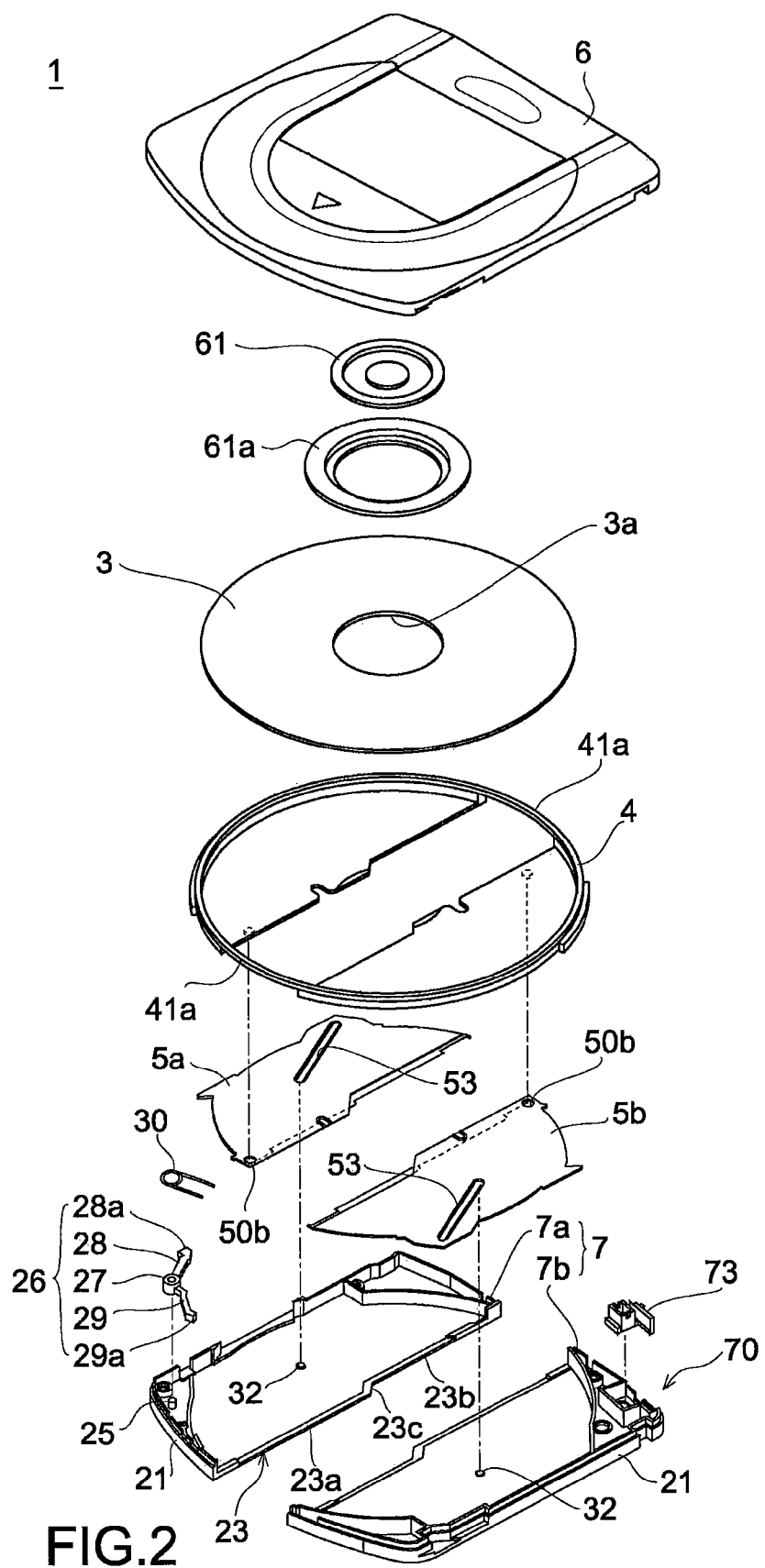
FIG. 2 An exploded perspective view of the disk cartridge.
Figure 3:
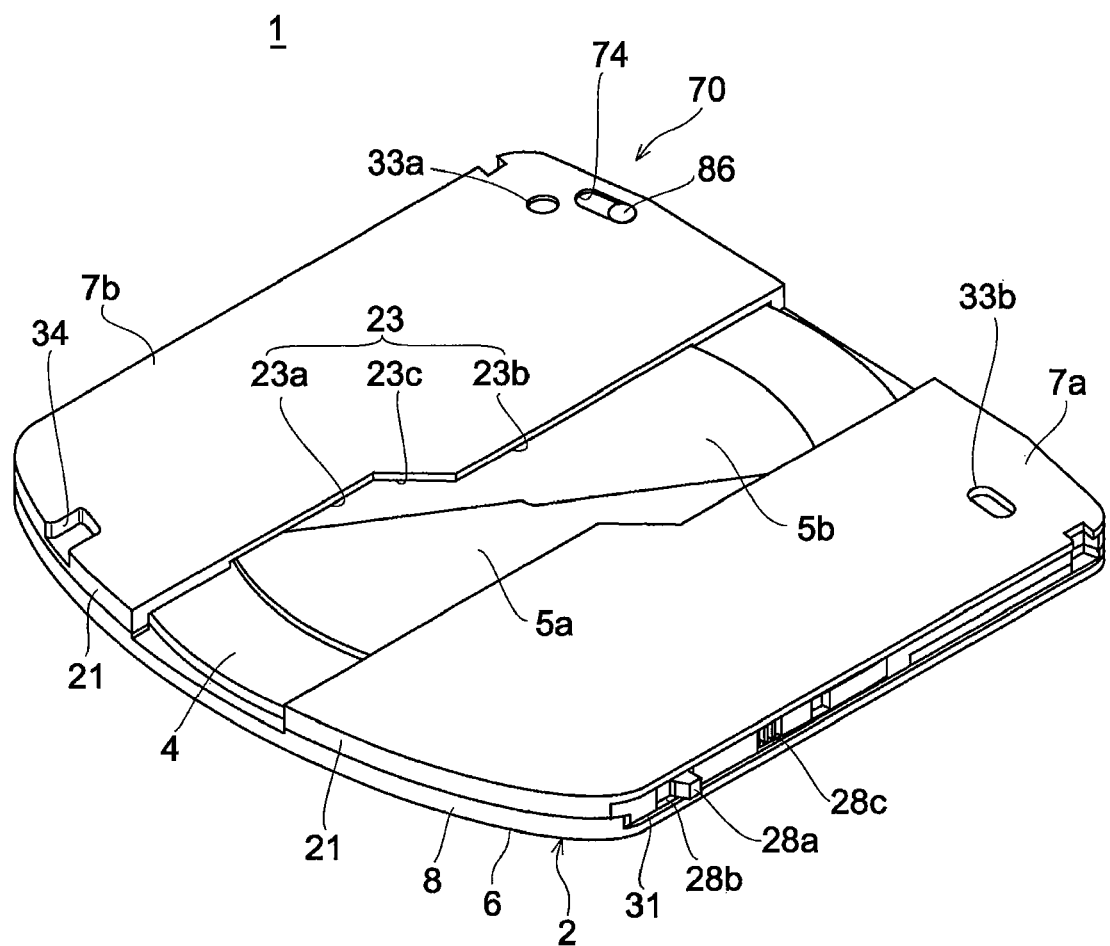
FIG. 3 A perspective view of the disk cartridge seen from a lower shell side.

FIGS. 1 to 3 each show an entire disk cartridge according to the embodiment of the present invention. Specifically, FIG. 1 is a perspective view of the disk cartridge seen from an upper shell side, FIG. 2 is an exploded perspective view of the disk cartridge, and FIG. 3 is a perspective view of the disk cartridge seen from a lower shell side.

A disk cartridge 1 of this embodiment is structured to rotatably accommodate an optical disc 3 in a cartridge case 2. Specifically, the disk cartridge 1 includes, inside the cartridge case 2, the optical disc 3, an inner rotor (intermediate shell) 4, and a pair of shutter members 5a and 5b.

As shown in FIG. 2, the optical disc 3 includes, at a center portion thereof, a center hole 3a that engages with a disc rotary-drive mechanism on a recording/reproducing apparatus side. Various disk-like recording media can be exemplified as the optical disc 3. As a disk-like recording medium, a reproduction-only optical disc on which various information signals such as music signals as audio information, picture signals as video signals, and music signals are recorded in advance can be exemplified. In addition to that, as the disk-like recording medium, a write-once optical disc in which those information signals can be written only once and a rewritable optical disc in which information can be repeatedly rewritten can be exemplified. It should be noted that in addition to the optical disc 3 described above, a magneto optical disc and a magnetic disk can be exemplified as the disk-like recording medium.

Regarding the optical disc 3, optical beams having a wavelength of about 400 nm can be used in recording and/or reproducing information, and an objective lens having a higher numerical aperture than an objective lens used for a CD or a DVD can be used as an optical pickup objective lens. Accordingly, still image data, moving image data, melodic data, processing data processed by a computer, and the like can be recorded with a higher density than in the case of a CD or a DVD.

As shown in FIG. 3, the disk cartridge 1 of this embodiment has a first opening 23 for recording and/or reproduction formed on a bottom surface of the cartridge case 2 from a foreside to a rear side. The first opening 23 enables recording or reproduction with respect to the optical disc 3 to be performed using two optical pickups by exposing a part of a signal recording surface of the optical disc 3 when the disk cartridge 1 is loaded in a loading portion of the recording/reproducing apparatus, and causing the optical pickups to enter the cartridge case 2 from both the foreside and the rear side thereof. As a result, an increase in speed in recording or reading out information signals can be realized.

Figure 4:
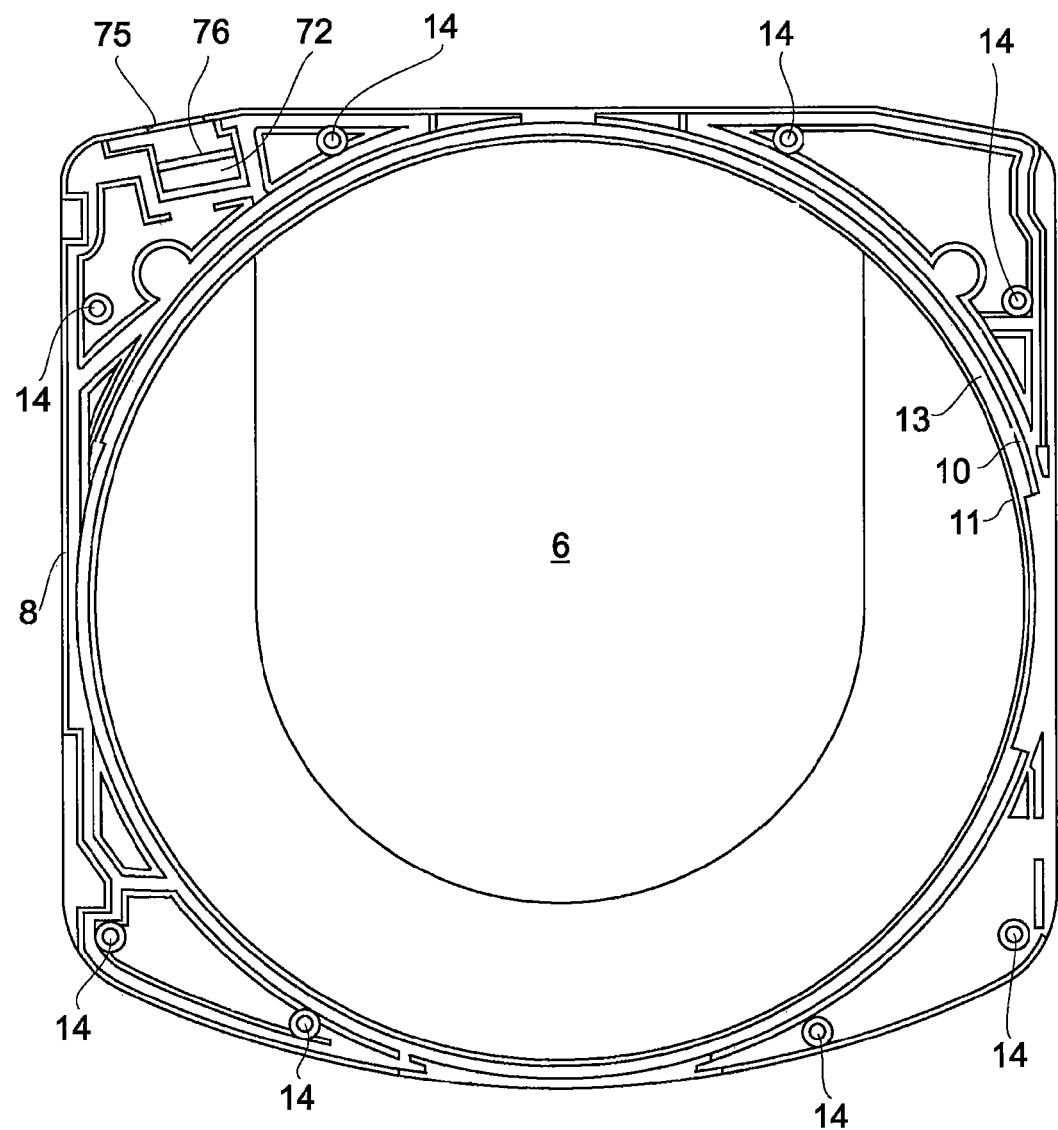
FIG. 4 A plan view of an inner surface side of the upper shell constituting the disk cartridge.
Figure 5:
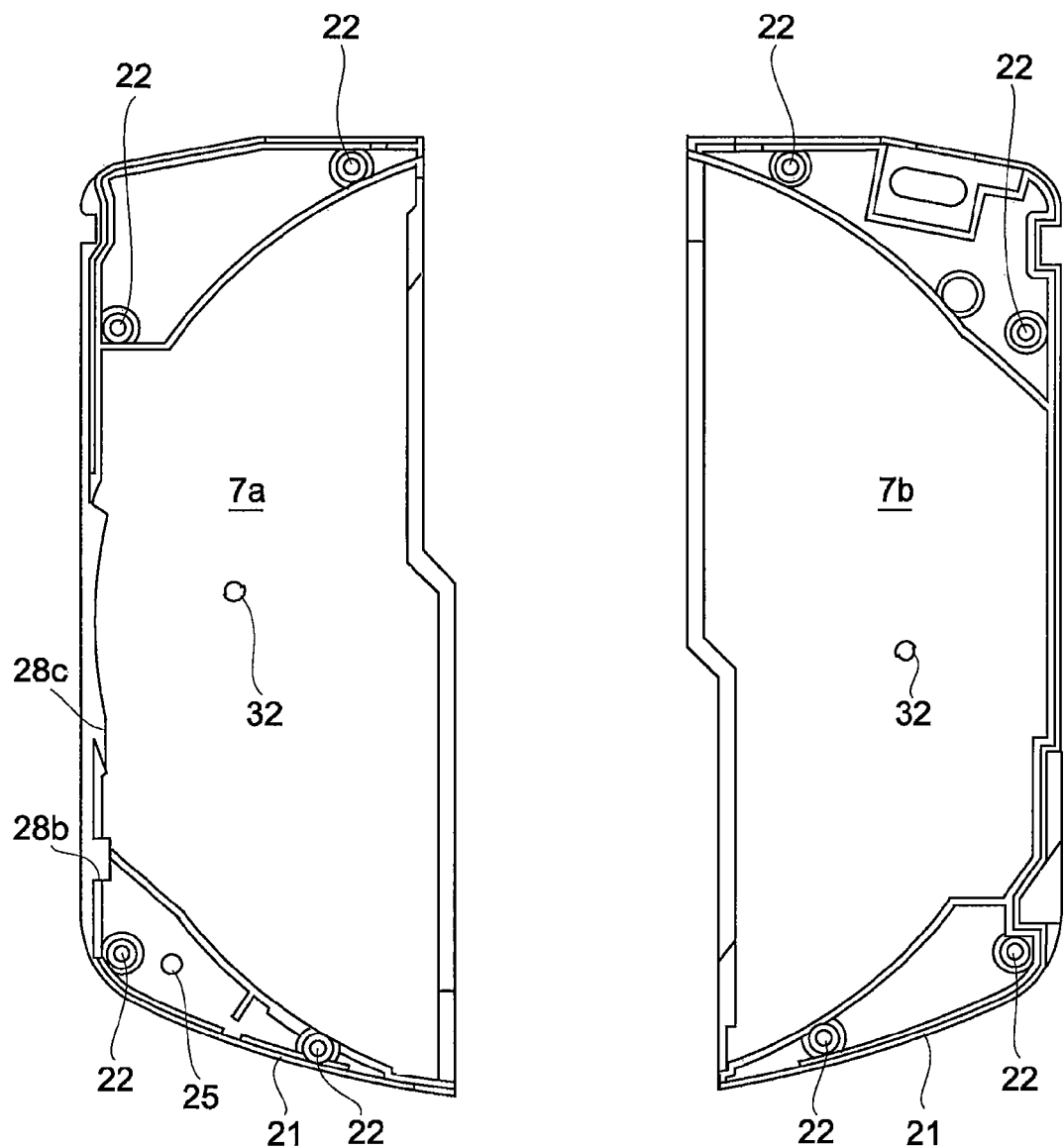
FIG. 5 A plan view of an inner surface side of the lower shell constituting the disk cartridge.

The cartridge case 2 is constituted of an upper shell 6 and a lower shell 7 (7a, 7b) that is divided into two and brought together with the upper shell 6. FIG. 4 is a bottom view showing an inner structure of the upper shell 6, and FIG. 5 is a plan view showing an inner structure of the lower shell 7.

The upper shell 6 constituting an upper surface of the cartridge case 2 is formed by injection-molding a thermoplastic resin material such as acrylonitrile butadiene styrene (ABS) and polycarbonate. As shown in FIG. 4, the upper shell 6 is formed such that, out of a main surface formed substantially rectangularly as a whole, a foreside thereof on an insertion end side with respect to the recording/reproducing apparatus is formed substantially as an arc. Moreover, in the upper shell 6, an outer circumferential wall 8 constituting a side surface of the cartridge case 2 is formed along an outer circumferential edge portion of the main surface.

Further, on an inner circumferential side of the outer circumferential wall 8, a nearly-toric inner circumferential wall 11 that constitutes a disc accommodation portion for rotatably accommodating the optical disc 3 is formed. The inner circumferential wall 11 constitutes a sidewall of the disc accommodation portion for accommodating the optical disc 3 together with the inner rotor 4.

On an outer circumferential side of the inner circumferential wall 11, an erected wall 10 is formed so as to surround the inner circumferential wall 11. A guide groove 13 that is substantially toric is formed between the inner circumferential wall 11 and the erected wall 10. The inner rotor 4 is rotatably engaged with the guide groove 13.

Further, in the vicinity of corner portions of the upper shell 6, a plurality of positioning pins 14 used to couple the lower shell 7 are formed. At a center portion of each of the positioning pins 14, a screw hole for screwing is formed.

On the other hand, the lower shell 7 includes semi-shell bodies 7a and 7b obtained by diving the lower shell 7 into two as shown in FIGS. 2, 3, and 5. By being coupled to the upper shell 6, the semi-shell bodies 7a and 7b constitute a bottom surface of the cartridge case 2. It should be noted that in descriptions below, the semi-shell bodies 7a and 7b will also be collectively referred to as lower shell 7.

Similar to the upper shell 6 described above, the lower shell 7 is formed by injection-molding a thermoplastic resin material such as acrylonitrile butadiene styrene (ABS) and polycarbonate. Foresides of the semi-shell bodies 7a and 7b are formed substantially as an arc so as to correspond to the approximate arc shape of the upper shell 6 on the foreside. In the semi-shell bodies 7a and 7b, an outer circumferential wall 21 constituting a side surface of the cartridge case 2 is formed along an outer circumferential edge of a main surface.

Furthermore, corner walls 24 that are approximately an arc are formed at respective corner portions of the lower shell 7. The corner walls 24 are structured to be positioned on an outer side of the inner circumferential wall 11 of the upper shell 6 when the semi-shell bodies 7a and 7b are brought together with the upper shell 6. Accordingly, foreign substances can effectively be prevented from entering the disc accommodation portion.

Nearly-cylindrical positioning concave portions 22 to which the positioning pins 14 of the upper shell 6 described above are respectively fit, are formed protrusively on the lower shell 7. At a bottom surface portion of each of the positioning concave portions 22, a through-hole into which a screw is inserted is formed. The upper shell 6 and the semi-shell bodies 7a and 7b of the lower shell 7 are coupled by bringing the outer circumferential wall 8 on the upper shell 6 side and the outer circumferential wall 21 of the semi-shell bodies 7a and 7b constituting the lower shell 7 together, fitting the positioning pins 14 on the upper shell 6 side in the positioning concave portions 22 on the lower shell 7 side, and screwing a screw in each of the screw holes of the positioning pins 14 via the through-holes of the positioning concave portions 22. Accordingly, the cartridge case 2 is structured.

The first opening 23 for recording and/or reproduction that first and second optical pickups of the recording/reproducing apparatus and a disc table that constitutes a disc rotary-drive mechanism of the recording/reproducing apparatus enter is formed between the semi-shell bodies 7a and 7b constituting the lower shell 7 on a bottom surface of the cartridge case 2. The first opening 23 is constituted of an opening 23a that the first optical pickup on the recording/reproducing apparatus side enters from a foreside of the cartridge case 2, an opening 23b that the second optical pickup on the recording/reproducing apparatus side enters from the rear side of the cartridge case 2, and an opening 23c for disc rotary drive provided at substantially the center portion of the bottom surface of the cartridge case 2 between the opening 23a and the opening 23b. Specifically, the openings 23a and 23b are formed to be large enough for the first and second optical pickups of the recording/reproducing apparatus to enter the cartridge case 2, and the opening 23c for rotary drive is formed to be large enough for the disc table constituting the disc rotary-drive mechanism of the recording/reproducing apparatus to enter the cartridge case 2.

Further, as shown in FIG. 2, a lock member 26 is attached to the cartridge case 2 at a corner portion on the foreside of the semi-shell body 7a constituting the lower shell 7. The lock member 26 locks the rotation of the inner rotor 4 when the inner rotor 4 and the pair of shutter members 5a and 5b to be described later are positioned at a closing position at which they close the first opening 23 of the cartridge case 2. Specifically, the lock member 26 includes a shaft hole 27 that is rotatably engaged with a support shaft 25 formed at the corner portion on the foreside of the semi-shell body 7a constituting the lower shell 7, an operation piece 28 elongated toward one of the side surface portions of the cartridge case 2 from the shaft hole 27, and a lock piece 29 elongated toward the inner rotor 4 side from the shaft hole 27.

As shown in FIGS. 2 and 5, at a tip end portion of the operation piece 28, an operation protrusion 28a exposed from a lock opening 28b formed on one of the side surface portions of the cartridge case 2 is provided. Moreover, at a tip end portion of the lock piece 29, a lock protrusion 29a that is in sliding contact with a ring portion 41 of the inner rotor 4 is provided.

Figure 6:
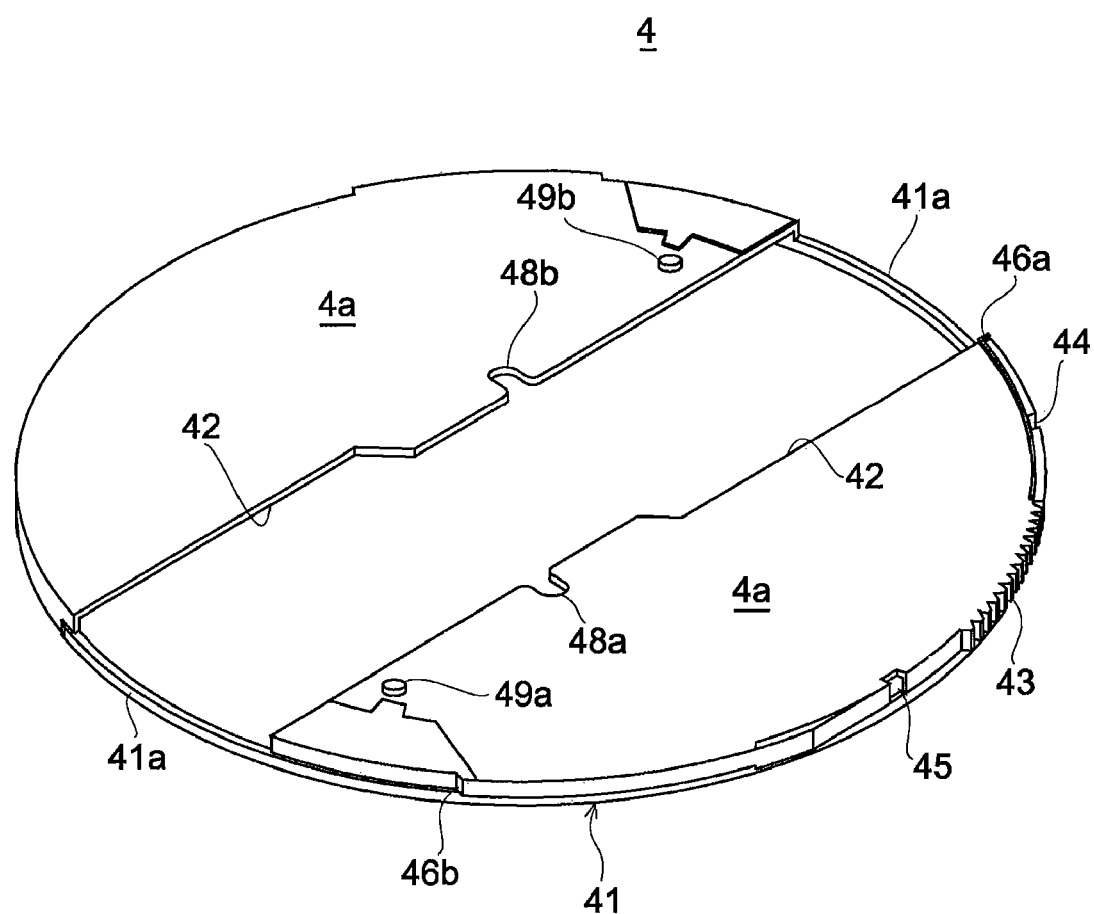
FIG. 6 A perspective view of an inner rotor constituting the disk cartridge.

To the support shaft 25 to which the lock member 26 as described above is attached, a bias member 30 such as a torsion coil spring is also attached. One arm of the bias member 30 is locked to the outer circumferential wall 21, and the other arm is locked to the lock member 26. Accordingly, the lock protrusion 29a is rotationally biased toward the inner rotor 4 side to engage with a second concave engagement portion 45 of the inner rotor 4 (FIG. 6). Then, by the operation protrusion 28a of the operation piece 28 being pressed, the lock member 26 is moved in a direction in which the lock piece 29 moves farther away from the ring portion 41 of the inner rotor 4 against the bias force of the bias member 30, and the engaged state between the lock protrusion 29a and the second concave engagement portion 45 is thus released.

Furthermore, as shown in FIG. 3, on one of the side surface portions of the cartridge case 2, a guide groove 31 for preventing an erroneous insertion of the disk cartridge 1 into the recording/reproducing apparatus is formed from the foreside to the rear side. At a bottom surface portion of the guide groove 31, the lock opening 28b from which the operation protrusion 28a of the lock member 26 described above is exposed and a rotor opening 28c from which a part of an outer circumferential portion of the inner rotor 4 is exposed are formed in the stated order from the foreside.

As shown in FIG. 2, on an inner surface of the lower shell 7, guide pins 32 that respectively engage with guide holes 53 formed as long holes on the shutter members 5a and 5b to be described later are formed protrusively in a nearly-cylindrical shape. The guide pins 32 move along the guide holes 53 in accordance with the rotation of the inner rotor 4 and thus causes the shutter members 5a and 5b to respectively rotate about shaft holes 50a and 50b.

On the bottom surface of the cartridge case 2 that the lower shell 7 constitutes, a plurality of positioning holes 33a and 33b used for positioning at a time of mounting to the recording/reproducing apparatus are provided as shown in FIG. 3. The positioning hole 33a as one of the holes is a perfect circle and functions as a location hole, whereas the positioning hole 33b as the other hole is an oval and functions as an alignment hole. Moreover, a concave portion 34 having the foreside and the bottom surface opened is provided at one of the corner portions on the foreside of the cartridge case 2, thus being an identification portion with respect to a disk cartridge having substantially the same outer shape but a different recording format. It is of course also possible to cause the concave portion 34 to function as an insertion guide groove or a positioning groove by engaging a guide pin therewith at a time of insertion to the recording/reproducing apparatus.

Figure 7:
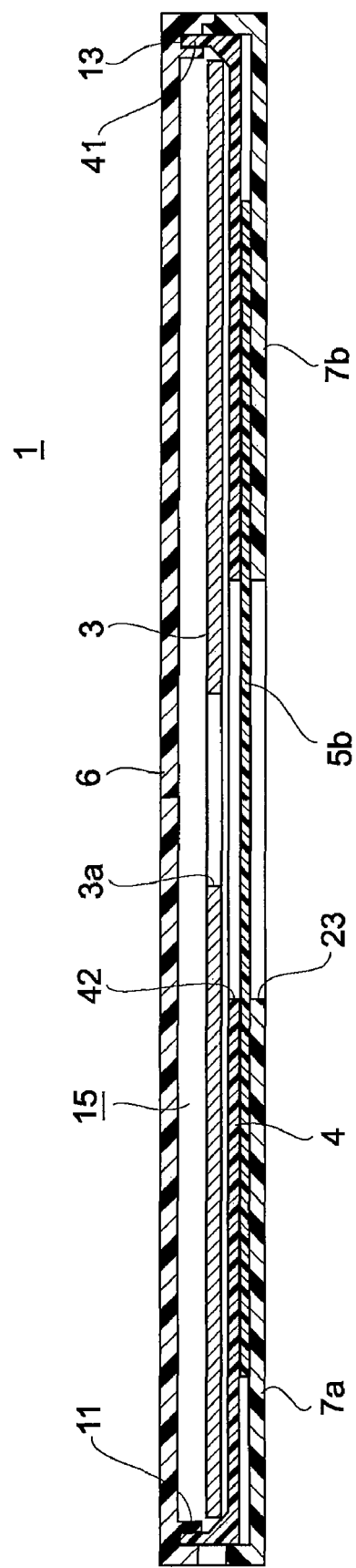
FIG. 7 A cross-sectional diagram of the disk cartridge.

Next, a structure of the inner rotor 4 will be described. FIG. 6 is a perspective view of the inner rotor 4 seen from the bottom surface side. Moreover, FIG. 7 is a cross-sectional diagram showing main portions of the disk cartridge 1.

The inner rotor 4 is formed by injection-molding a thermoplastic resin material such as polyoxymethylene (POM). On a main surface portion 4a of the inner rotor 4, the optical disc 3 is placed such that a signal recording surface 3a faces the main surface portion 4a. When the main surface portion 4a is placed inside the cartridge main body 2 as shown in FIG. 7, the inner circumferential wall 11 of the upper shell 6 and the main surface portion 4a of the inner rotor 4 constitute a disc accommodation portion 15 (FIG. 7).

The inner rotor 4 is formed to be substantially circular as shown in FIG. 6, and a nearly-toric ring portion 41 that engages with the guide groove 13 of the upper shell 6 described above is formed on an outer circumferential edge portion thereof. By the ring portion 41 engaging with the guide groove 13 of the upper shell 6, the inner rotor 4 is rotatably supported inside the cartridge case 2.

As shown in FIG. 6, a second opening 42 almost the same size as the first opening 23 formed on the lower shell 7 is formed on the inner rotor 4. An area of the ring portion 41 where the second opening 42 is formed is constituted as a coupling portion 41a.

Figure 8:
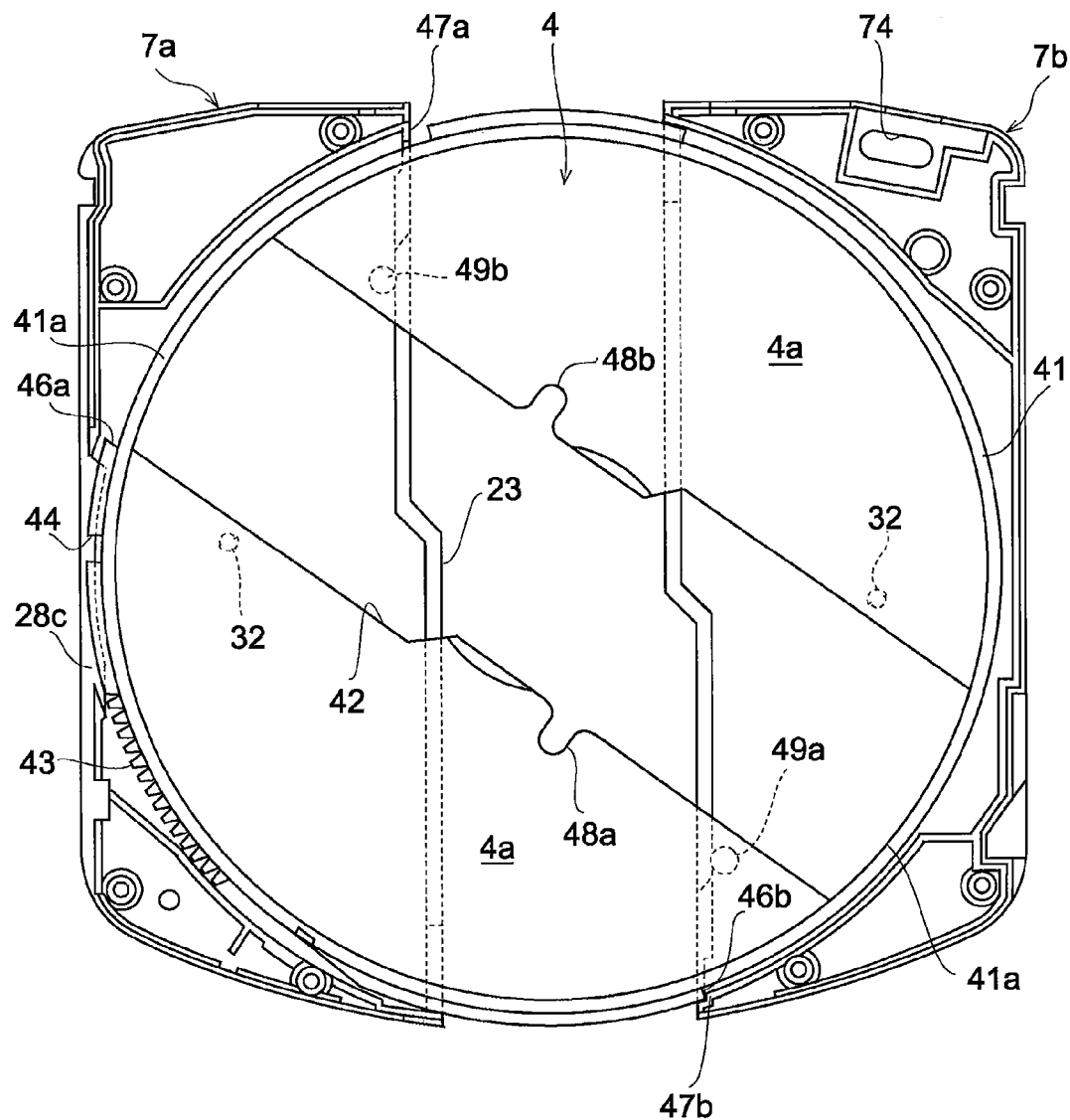
FIG. 8 A plan view showing a state where the inner rotor is rotated in a direction in which an opening of the lower shell is closed.
Figure 9:
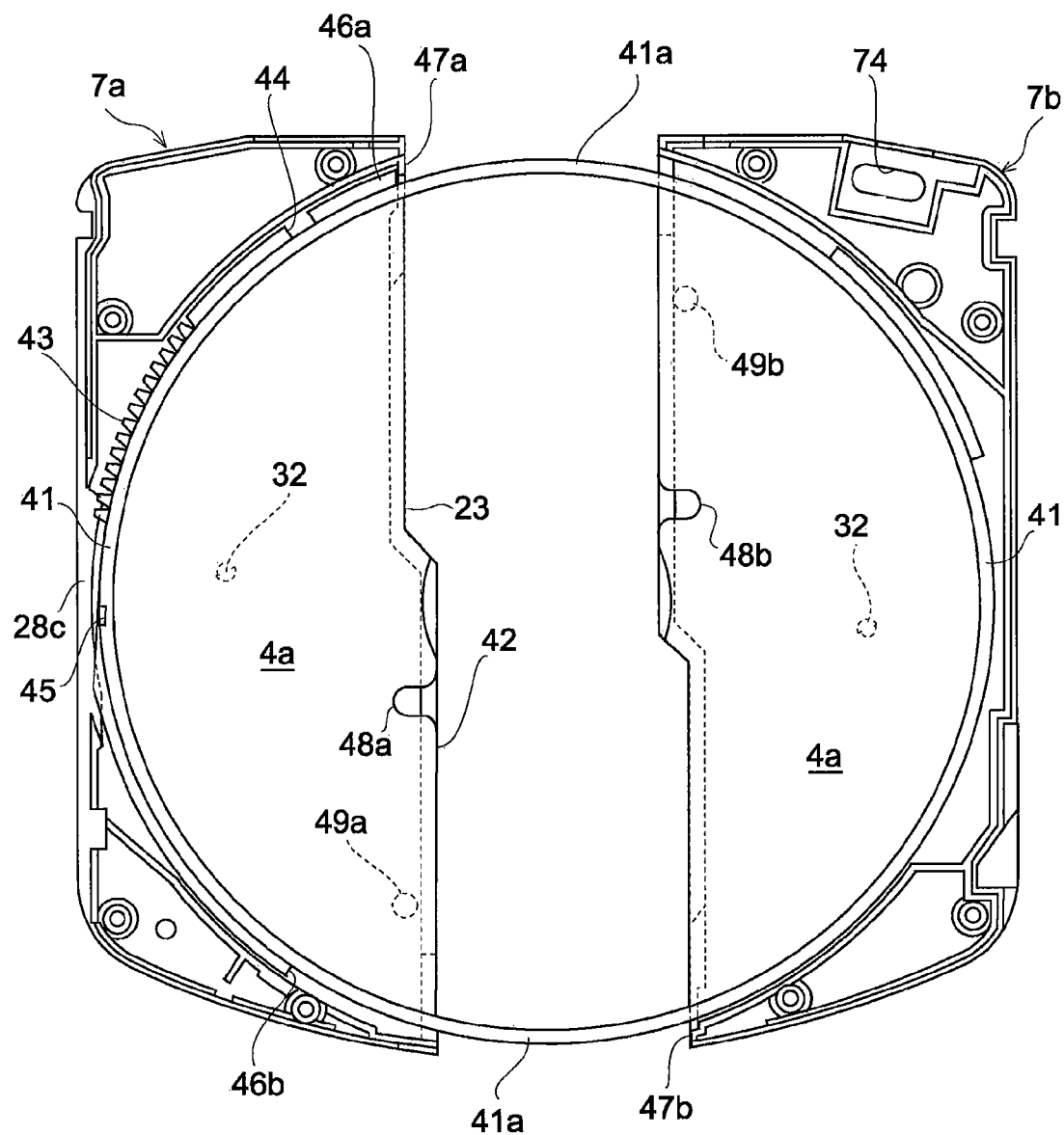
FIG. 9 A plan view showing a state where the inner rotor is rotated in a direction in which the opening of the lower shell is opened.

FIG. 8 is a plan view showing a state where the inner rotor 4 is rotated in a direction in which the opening 23 of the lower shell 7 is closed, and FIG. 9 is a plan view showing a state where the inner rotor 4 is rotated in a direction in which the opening 23 of the lower shell 7 is opened.

On an outer circumferential surface of the ring portion 41, a gear portion 43 for rotating the inner rotor 4 is formed. As shown in FIG. 8, the gear portion 43 is formed across an area between a position at which, when the inner rotor 4 is at the closing position of the first opening 23 of the lower shell 7, it is exposed from the foreside of the rotor opening 28c described above, and a position at which, when the inner rotor 4 is at the opening position shown in FIG. 9 at which the first opening 23 of the lower shell 7 is opened, it is exposed from the rear side of the rotor opening 28c described above.

As shown in FIG. 6, a first concave engagement portion 44 that engages with a first engagement protrusion of a shutter opening member constituting a shutter opening mechanism on the recording/reproducing apparatus side is formed on one side of the gear portion 43, and a second concave engagement portion 45 that engages with a second engagement protrusion of the shutter opening member is formed on the other side of the gear portion 43. Those concave engagement portions 44 and 45 are exposed from the rotor opening 28c together with the gear portion 43. The first concave engagement portion 44 first engages with the first engagement protrusion of the shutter opening member when the disk cartridge 1 is loaded in the recording/reproducing apparatus. The second concave engagement portion 45 engages with the lock protrusion 29a of the lock member 26 when the shutter members 5a and 5b to be described later are at the closing position and engages with the second engagement protrusion of the shutter opening member when the shutter members 5a and 5b are at the opening position of the first and second openings 23 and 42.

Further, on the outer circumferential surface of the ring portion 41, a pair of rotation restriction protrusions 46a and 46b for restricting a rotational amount of the inner rotor 4 are formed protrusively with a predetermined gap therebetween. On the other hand, a pair of restriction portions 47a and 47b that come into contact with the rotation restriction protrusions 46a and 46b are respectively formed on the lower shells 7a and 7b.

As shown in FIG. 9, by the inner rotor 4 rotating in the direction in which the first opening 23 is opened and the rotation restriction protrusion 46a being brought into contact with the restriction portion 47a, further rotations of the inner rotor 4 are restricted. When the rotation of the inner rotor 4 in this direction is restricted, the inner rotor 4 is at the opening position of the first opening 23 and the second opening 42 of the inner rotor 4 practically coincides with the first opening 23 as shown in FIG. 9.

On the other hand, as shown in FIG. 8, by the inner rotor 4 rotating in the direction in which the first opening 23 is closed and the rotation restriction protrusion 46b being brought into contact with the restriction portion 47b, further rotations of the inner rotor 4 are restricted. When the rotation of the inner rotor 4 in this direction is restricted, the inner rotor 4 is at the closing position of the first opening 23 and the second opening 42 is tilted maximumly with respect to the first opening 23.

Further, as shown in FIG. 6, on the inner rotor 4, a pair of support shafts 49a and 49b that rotatably support the pair of shutter members 5a and 5b, respectively, are formed protrusively on a surface of the main surface portion 4a on the other side of the side from which the ring portion 41 protrudes. The pair of support shafts 49a and 49b are disposed at positions symmetrical with respect to a point at a center portion of the inner rotor 4, that is, disposed so as to have a phase difference of 180°.

The pair of shutter members 5a and 5b attached to the inner rotor 4 for opening and closing the first opening 23 as described above are symmetric as shown in FIGS. 10 to 12 and rotatably attached to the pair of support shafts 49a and 49b of the inner rotor 4 while having a phase difference of 180°. It should be noted that parts common to the pair of shutter members 5a and 5b will be denoted by the same reference numerals, and detailed descriptions thereof will be omitted.

Figure 10:
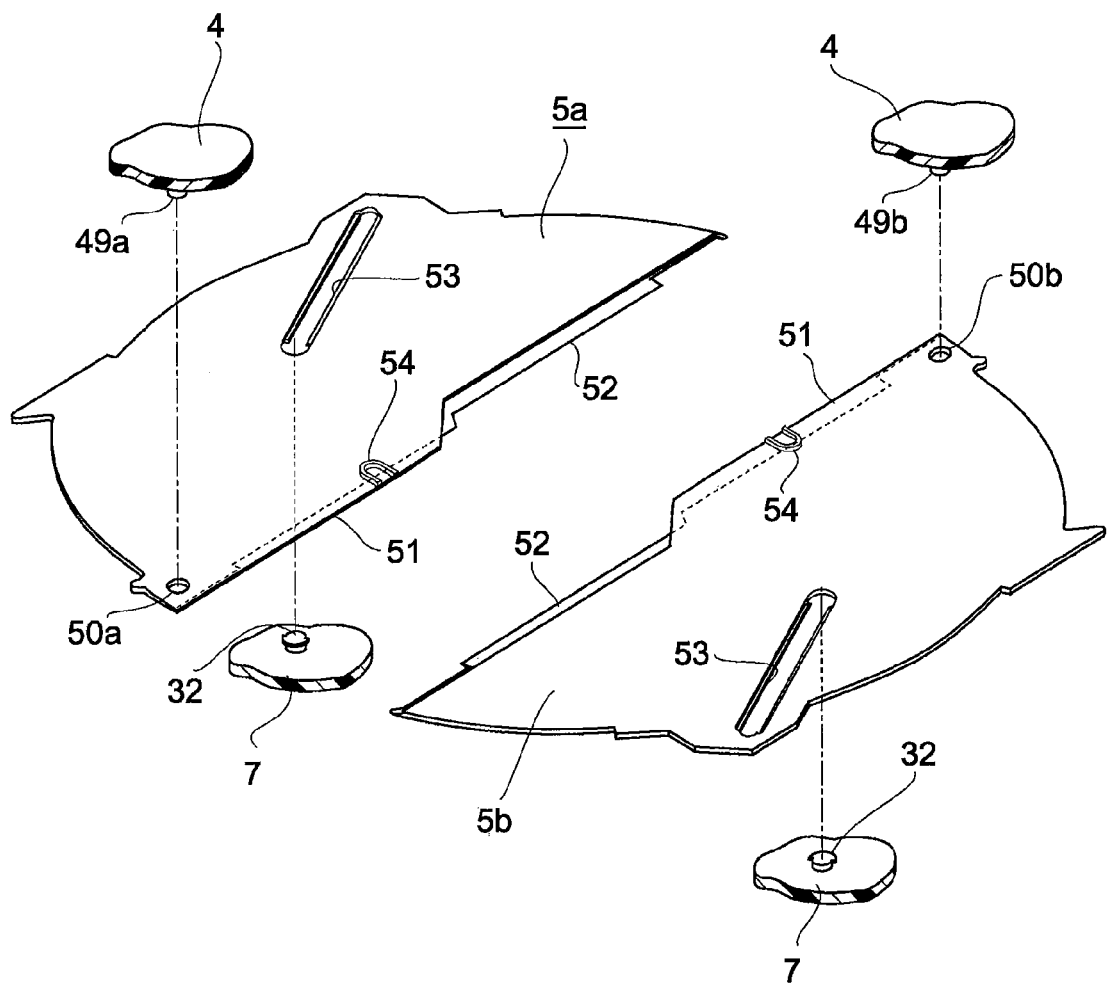
FIG. 10 A perspective view of a pair of shutter members constituting a shutter of the disk cartridge.

Hereinafter, referring to FIGS. 10 to 12, the shutter members 5a and 5b will be described in detail. FIG. 10 is a perspective view of the pair of shutter members 5a and 5b, FIG. 11 is a perspective view showing a state where the opening 42 of the inner rotor 4 is opened by the shutter members 5a and 5b, and FIG. 12 is a perspective view showing a state where the opening 42 of the inner rotor 4 is closed by the shutter members 5a and 5b.

The shutter members 5a and 5b constitute a "shutter" according to the embodiment. The shutter members 5a and 5b are formed by injection-molding a thermoplastic resin material such as polyoxymethylene (POM) as in the case of the inner rotor 4 described above. The shutter members 5a and 5b are formed substantially as semicircular flat plates, and the shaft holes 50a and 50b that rotatably engage with the support shafts 49a and 49b of the inner rotor 4 are respectively formed on base end portions thereof.

Figure 11:
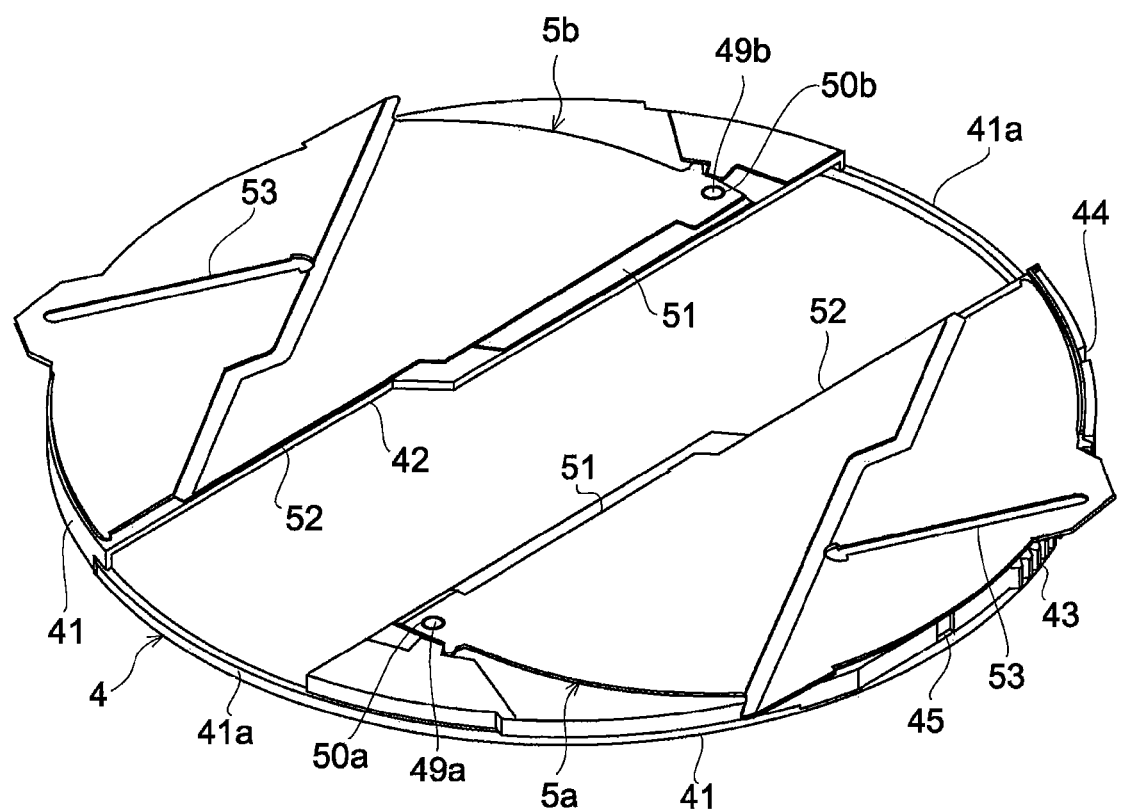
FIG. 11 A perspective view showing a state where an opening of the inner rotor is opened by the shutter members.
Figure 12:
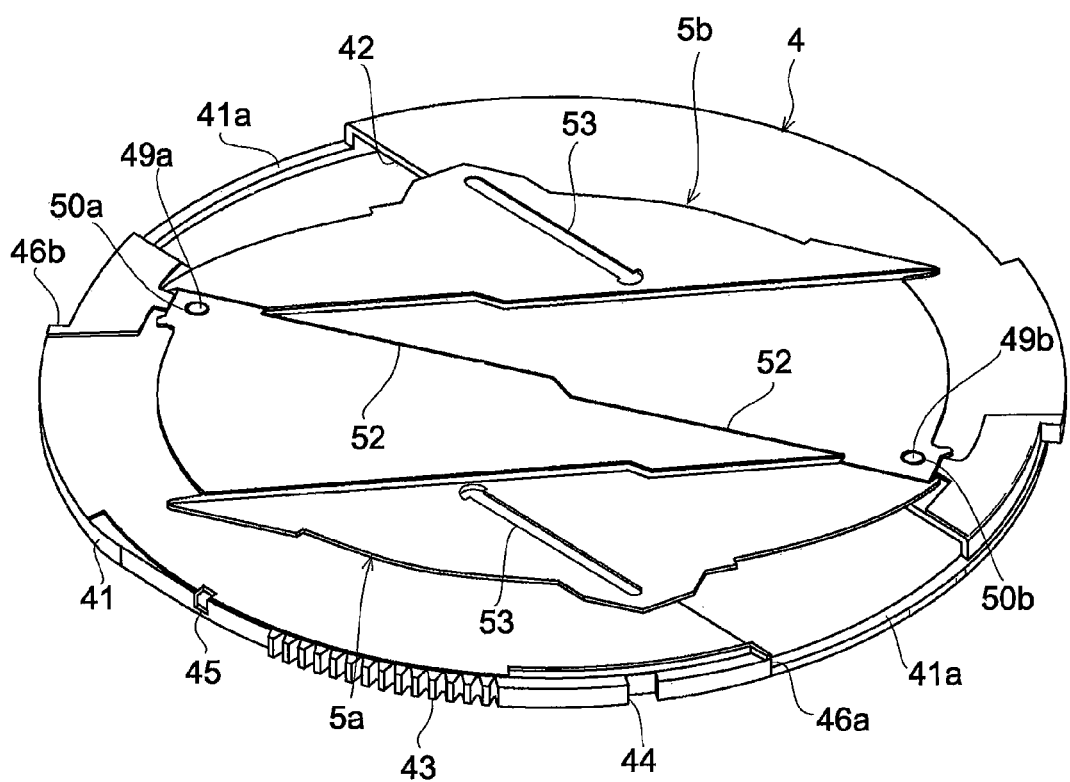
FIG. 12 A perspective view showing a state where the opening of the inner rotor is closed by the shutter members.

Moreover, at chord line parts as surfaces of the pair of shutter members 5a and 5b to be brought together, a first engagement portion 51 extending toward the base end portion from the center portion and a second engagement portion 52 extending toward a tip end portion from the center portion are formed as shown in FIGS. 10 to 12. Of those, the lower shell 7 side of the first engagement portion 51 is a tilted surface, and the upper shell 6 side of the second engagement portion 52 is a tilted surface. As shown in FIGS. 11 and 12, by the pair of shutter members 5a and 5b respectively rotating about the support shafts 49a and 49b of the inner rotor 4 in directions to be brought close to each other, the first engagement portion 51 of the shutter member 5a and the second engagement portion 52 of the shutter member 5b engage with each other, and the first engagement portion 51 of the shutter member 5b and the second engagement portion 52 of the shutter member 5a engage with each other.

Moreover, on the shutter members 5a and 5b, the guide holes 53 that respectively engage with the pair of guide pins 32 protrusively formed on the inner surface of the lower shell 7 are formed as shown in FIGS. 10 to 12. The guide holes 53 are formed with a predetermined length while extending from mid portions of the chord line portions toward the shaft holes 50a and 50b, respectively, so that the shutter members 5a and 5b are rotated between the closing position and the opening position of the second opening 42.

On the other hand, as shown in FIG. 10, each of the shutter members 5a and 5b has a protrusion 54 formed on an upper surface of the first engagement portion 51. The protrusions 54 are formed at positions that are, when the shutter members 5a and 5b are engaged via the first and second engagement portions 51 and 52, opposed to an inner circumferential portion (non-signal-recording area) at the center of the optical disc 3 accommodated in the disc accommodation portion 15. Accordingly, even when the shutter members 5a and 5b are deformed by an external force that acts on the shutter members 5a and 5b at a time the disk cartridge 1 that is in a state where the first opening 23 of the cartridge case 2 is closed by the shutter members 5a and 5b is not used, by bringing the protrusions 54 in contact with the inner circumferential portion of the optical disc 3, the signal recording surface of the optical disc 3 and the shutter members 5a and 5b can be prevented from being brought into contact with each other.

It should be noted that at a time the disk cartridge 1 that is in a state where the first opening 23 is opened is used, the protrusions 54 of the shutter members 5a and 5b are respectively accommodated in notched portions 48a and 48b formed at circumferential edges of the second opening 42 of the inner rotor 4. Accordingly, the shutter members 5a and 5b can appropriately move to the opening position.

In addition to the structure described above, the disk cartridge 1 structured as described above is provided with a clamping plate 61 at approximately a center portion of the inner surface of the upper shell 6 as shown in FIG. 2. The clamping plate 61 holds the optical disc 3 together with the disc table that constitutes the disc rotary-drive portion of the recording/reproducing apparatus and is attached to the upper shell 6 by an attachment ring 61a. Specifically, the clamping plate 61 is attached by welding, while it is sandwiched between the attachment ring 61a and approximately the center portion of the inner surface of the upper shell 6, the attachment ring 61a at approximately the center portion of the inner surface of the upper shell 6, for example. Then, by the center hole 3b engaging with the disc table and the optical disc 3 being sandwiched by the disc table and the clamping plate 61, the optical disc 3 becomes rotatable inside the disc accommodation portion 2a.

It should be noted that a method of fixing the semi-shell bodies 7a and 7b of the lower shell 7 to the upper shell 6 is not limited to means such as a screw described above, and it is also possible to integrally bond the upper shell 6 and the semi-shell bodies 7a and 7b of the lower shell 7 using an adhesive, ultrasonic welding, and the like.

Figure 13:
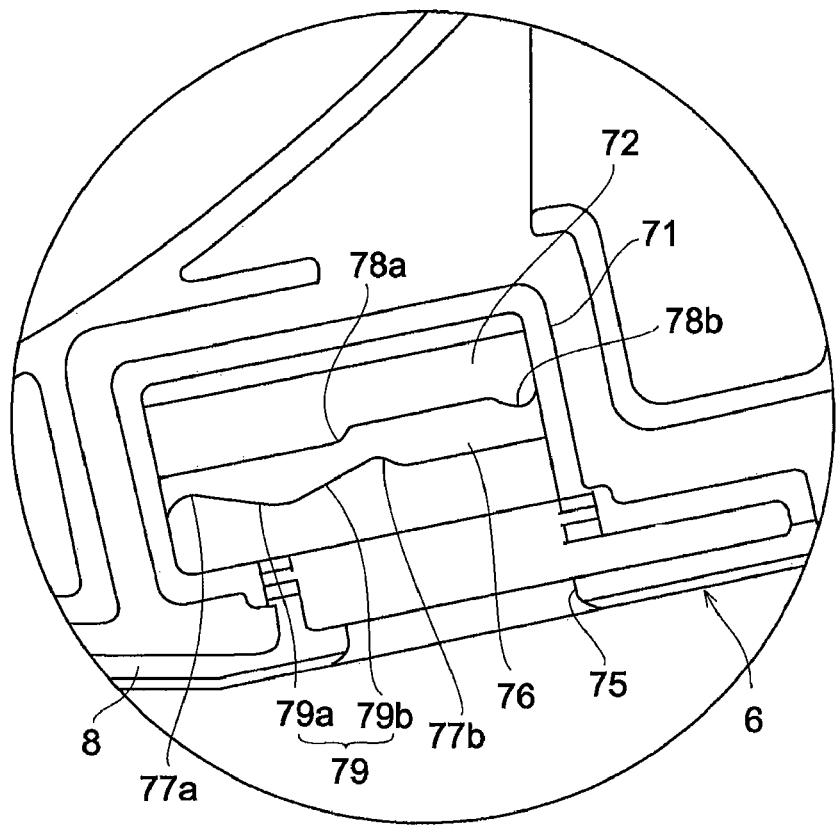
FIG. 13 A plan view of a tab accommodation portion formed on the inner surface of the upper shell constituting the disk cartridge.
Figure 14:
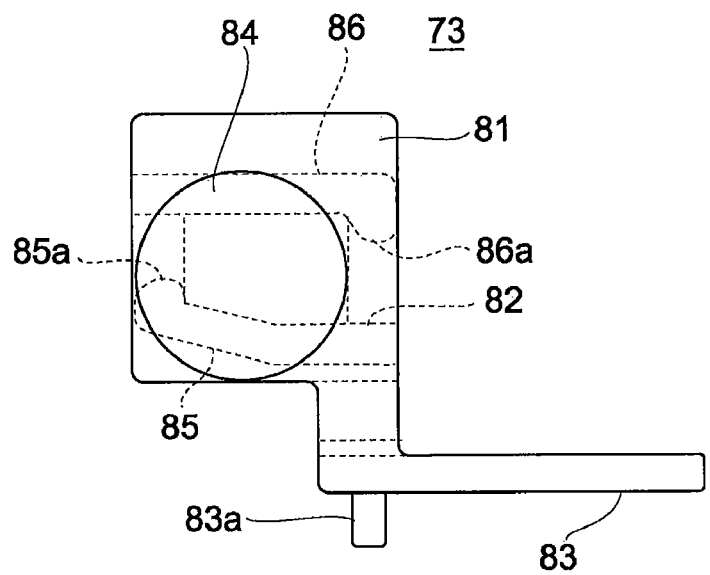
FIG. 14 A plan view of a tab member accommodated in the tab accommodation portion.

Next, an unintentional deletion prevention mechanism according to the embodiment will be described. It should be noted that FIG. 13 is a plan view of a tab accommodation portion 72, FIG. 14 is a plan view of a tab member 73, and FIG. 15 are plan views of the tab member 73 accommodated in the tab accommodation portion 72.

As shown in FIGS. 2 and 3, an unintentional deletion prevention mechanism 70 for preventing information signals recorded onto the optical disc 3 from being deleted unintentionally is provided at one corner portion on the back side of the cartridge case 2. Specifically, the unintentional deletion prevention mechanism 70 includes the tab accommodation portion 72 in an area surrounded by an external wall 8 of the upper shell 6 and a circumferential wall 71 continuous with the external wall 8 as shown in FIG. 13. Further, the tab member (unintentional deletion prevention member) 73 that is slid by the user is provided in the tab accommodation portion 72 as shown in FIG. 15.

Figure 15:
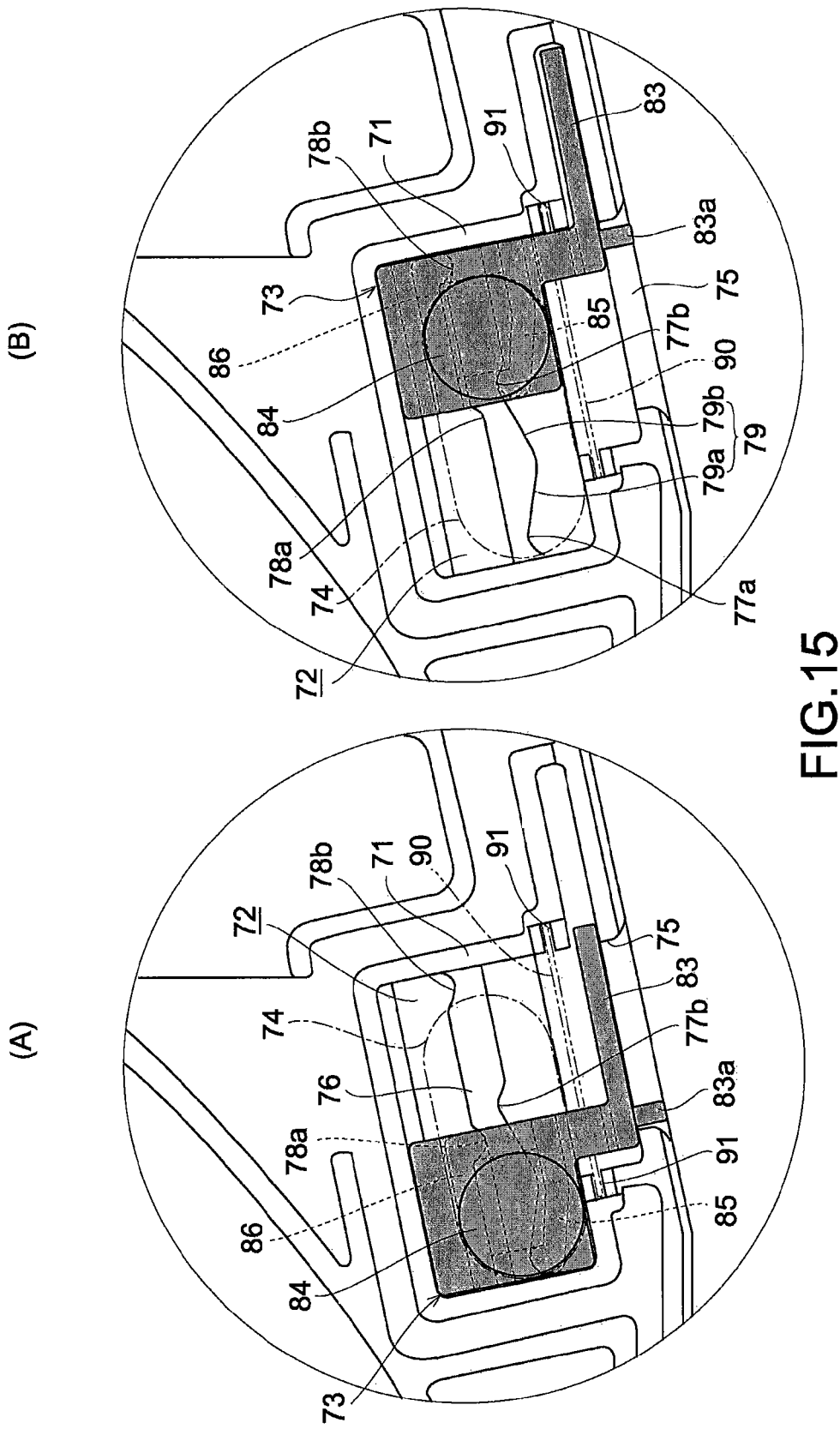

As shown in FIGS. 3, 5, and 15, the tab accommodation portion 72 includes a detection hole 74 formed on the semi-shell body 7b. The detection hole 74 is a long hole and formed such that a long-axis direction thereof becomes a slide direction of the tab member 73. Moreover, in the tab accommodation portion 72, a substantially-rectangular operation hole 75 is formed across the external wall 8 of the upper shell 6 and the outer circumferential wall 21 of the semi-shell body 7b.

Furthermore, a guide wall 76 is formed along the slide direction of the tab member 73 in the tab accommodation portion 72. The guide wall 76 corresponds to a "guide portion" according to the embodiment and includes a first recordable-position concave engagement portion 77a, a first unrecordable-position concave engagement portion 77b, a second recordable-position concave engagement portion 78a, a second unrecordable-position concave engagement portion 78b, and a bump 79.

Specifically, on one surface of the guide wall 76 facing an outer side of the cartridge case 2, the first recordable-position concave engagement portion 77a for holding the tab member 73 at the recordable position and the first unrecordable-position concave engagement portion 77b for holding the tab member 73 at the unrecordable position are formed so as to be aligned in the slide direction of the tab member 73. In addition, on the other surface of the guide wall 76 facing an inner side of the cartridge case 2, the second recordable-position concave engagement portion 78a and the second unrecordable-position concave engagement portion 78b are formed so as to be aligned in the slide direction of the tab member 73. The second recordable-position concave engagement portion 78a is used for holding the tab member 73 at the recordable position with the first recordable-position concave engagement portion 77a. The second unrecordable-position concave engagement portion 78b is used for holding the tab member 73 at the unrecordable position with the first unrecordable-position concave engagement portion 77b.

Between the first recordable-position concave engagement portion 77a and the first unrecordable-position concave engagement portion 77b on one surface of the guide wall 76, the bump 79 shown in FIG. 13 is formed to be substantially triangular in plan view. The bump 79 protrudes from one surface of the guide wall 76 toward the operation hole 75 of the cartridge case 2 and thus forms guide surfaces 79a and 79b between the first recordable-position concave engagement portion 77a and the first unrecordable-position concave engagement portion 77b. The guide surfaces 79a and 79b are tilted linear surfaces that are formed continuously, and a boundary portion (apex of bump 79) of the guide surfaces is located at an intermediate position between the concave engagement portion 77a and the concave engagement portion 77b.

The tab member 73 accommodated in such a tab accommodation portion 72 includes a base portion 81 as shown in FIG. 14. A guide groove 82 that engages with the guide wall 76 of the tab accommodation portion 72 is formed on the base portion 81. Further, an operation piece 83 to be exposed from the operation hole 75 of the tab accommodation portion 72 is formed on the base portion 81. The operation piece 83 is substantially rectangular and formed with a size enough to block the operation hole 75 from the inside, and an operation protrusion 83a for facilitating a slide operation is formed thereon.

Further, on the base portion 81, a detection portion 84 that partially blocks the detection hole 74 formed on the tab accommodation portion 72 is formed. The detection portion 84 is formed as a perfect circle while the detection hole 74 is formed as an oval, and partially blocks the detection hole 74. The detection mechanism on the recording/reproducing apparatus side judges whether the disk cartridge 1 is in a recordable state or an unrecordable state by mechanically or optically detecting a blocking position or opening position by the detection portion 84 of the detection hole 74. In this embodiment, FIG. 15(A) shows a state where the tab member 73 is at the recordable position, and FIG. 15(B) shows a state where the tab member 73 is at the unrecordable position.

Also formed on the base portion 81 are a first elastic arm 85 and a second elastic arm 86 that are provided apart from each other. The first and second elastic arms 85 and 86 correspond to sidewall portions of the guide groove 82 and elastically come into contact with the guide wall 76. The first and second elastic arms 85 and 86 protrude in the slide direction of the tab member 73 and extend in opposite directions from a bottom portion of the base portion 81.

Figure 16:
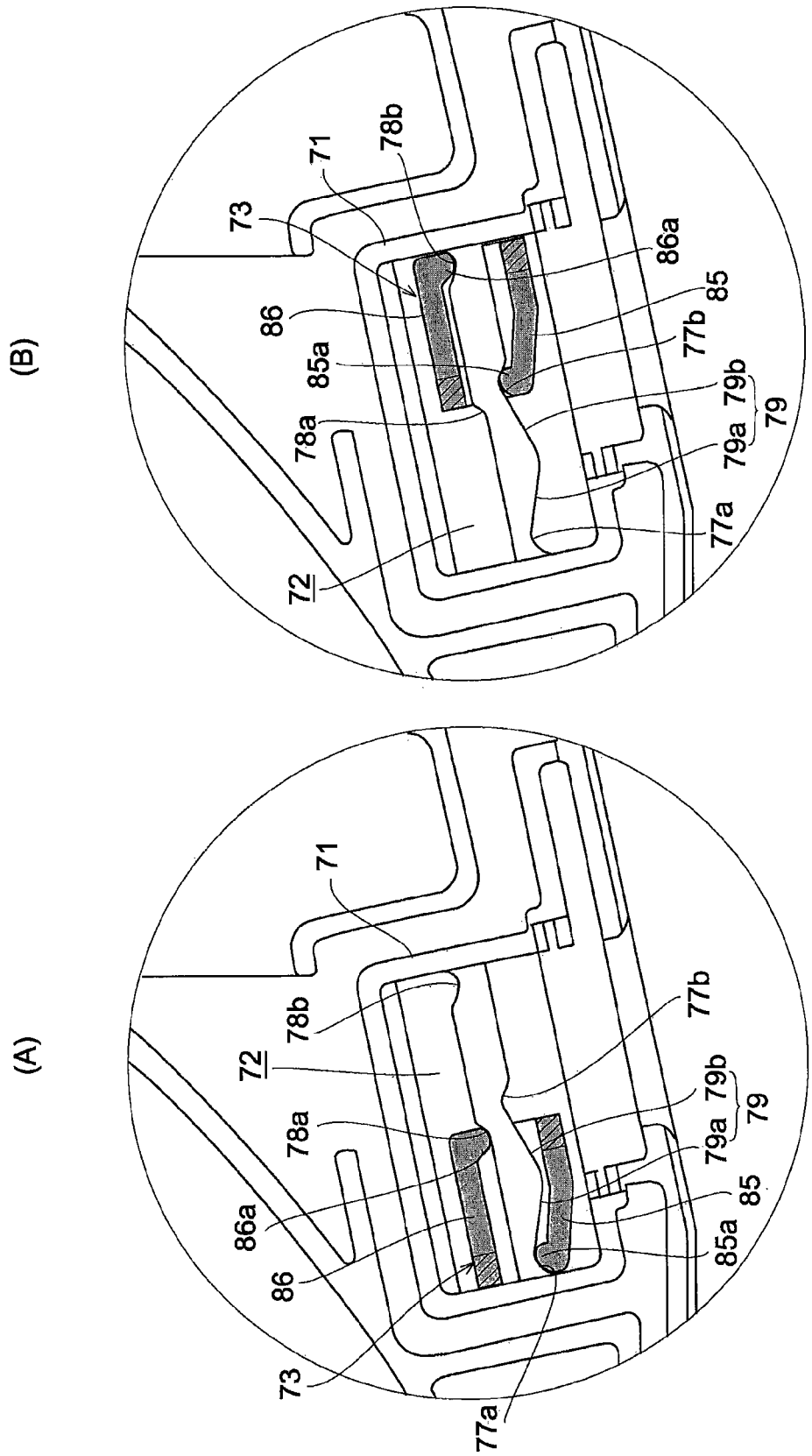

FIG. 16 are plan views each showing a relationship between the tab accommodation portion 72 and the elastic arms 85 and 86 of the tab member 73, in which FIG. 16(A) shows a state where the tab member 73 is at the recordable position, and FIG. 16(B) shows a state where the tab member 73 is at the unrecordable position. As shown in FIG. 16, the first elastic arm 85 faces one surface of the guide wall 76 and has a first convex engagement portion 85a capable of engaging with the first recordable-position concave engagement portion 77a or the first unrecordable-position concave engagement portion 77b formed at a tip end portion thereof. On the other hand, the second elastic arm 86 faces the other surface of the guide wall 76 and has a second convex engagement portion 86a capable of engaging with the second recordable-position concave engagement portion 78a or the second unrecordable-position concave engagement portion 78b formed at a tip end portion thereof. In addition, the first elastic arm 85 extends obliquely toward the guide wall 76.

As described above, the bump 79 having the guide surfaces 79a and 79b is formed between the first recordable-position concave engagement portion 77a and the first unrecordable-position concave engagement portion 77b of the guide wall 76. Here, at a time the tab member 73 moves from the recordable position shown in FIG. 16(A) to the unrecordable position shown in FIG. 16(B), the guide surface 79a corresponds to a "first guide surface" according to the present invention for gradually increasing an elastic force of the elastic arm 85 in accordance with the movement of the tab member, and the guide surface 79b corresponds to a "second guide surface" according to the present invention for gradually decreasing the elastic force of the elastic arm 85 in accordance with the movement of the tab member 73. Moreover, at a time the tab member 73 moves from the unrecordable position shown in FIG. 16(B) to the recordable position shown in FIG. 16(A), the guide surface 79b corresponds to the "first guide surface" according to the present invention for gradually increasing the elastic force of the elastic arm 85b in accordance with the movement of the tab member 73, and the guide surface 79a corresponds to the "second guide surface" according to the present invention for gradually decreasing the elastic force of the elastic arm 85 in accordance with the movement of the tab member 73.

A flat surface substantially parallel to the slide direction of the tab member 73 is formed between the second recordable-position concave engagement portion 78a and the second unrecordable-position concave engagement portion 78b of the guide wall 76. Therefore, the elastic force of the elastic arm 86 is kept almost constant before the convex engagement portion 86a of the second elastic arm 86 engages with the second unrecordable-position concave engagement portion 88b after passing the second recordable-position concave engagement portion 88a at the time the tab member 73 moves from the recordable position to the unrecordable position. The same holds true also when the tab member 73 moves from the unrecordable position to the recordable position.

Next, an operation and effect of the thus-structured disk cartridge 1 of this embodiment will be described while comparing it with a structure of a comparative example shown in FIG. 17.

FIG. 17 are plan views each showing a main portion of the structure of the unintentional deletion prevention mechanism of the disk cartridge according to the comparative example, in which FIG. 17(A) shows a state where a tab member 173 is at the recordable position, and FIG. 17(B) shows a state where the tab member 173 is at the unrecordable position.

The unintentional deletion prevention mechanism according to the comparative example includes the tab member 173 as an unintentional deletion prevention member and a tab accommodation portion 172 for slidably accommodating the tab member 173. A guide wall 176 is formed along a slide direction of the tab member 173 in the tab accommodation portion 172. On one surface of the guide wall 176, a first recordable-position concave engagement portion 177a and a first unrecordable-position concave engagement portion 177b for positioning elastic arms 185 and 186 of the tab member 173 at the recordable position and the unrecordable position, respectively, are formed. Similarly, on the other surface of the guide wall 176, a second recordable-position concave engagement portion 178a and a second unrecordable-position concave engagement portion 178b for positioning the elastic arms 185 and 86 of the tab member 173 at the recordable position and the unrecordable position, respectively, are formed.

On the guide wall 176 of the comparative example shown in FIG. 17, a surface between the first recordable-position concave engagement portion 177a and the first unrecordable-position concave engagement portion 177b and a surface between the second recordable-position concave engagement portion 178a and the second unrecordable-position concave engagement portion 178b are formed as flat surfaces parallel to the slide direction of the tab member 173. Therefore, the elastic forces of the elastic arms 185 and 186 on the flat surfaces between the recordable-position concave engagement portions 177a and 178a and the unrecordable-position concave engagement portions 177b and 178b are approximately constant at the time the tab member 173 moves from the recordable position to the unrecordable position or from the unrecordable position to the recordable position. As a result, it becomes possible to stop the tab member 173 in mid-course in a case where an operational force with respect to the tab member 173 is lost in the middle of the movement between the recordable position and the unrecordable position. In this case, a recordable state or an unrecordable state cannot be stably detected on the recording/reproducing apparatus side, thus resulting in a fear that a reliability of the unintentional deletion prevention mechanism may be impaired due to lowering of detection accuracy.

In contrast, in the disk cartridge 1 of this embodiment, the guide wall 76 having the bump 79 having the structure described above is formed in the tab accommodation portion 72 constituting the unintentional deletion prevention mechanism. Therefore, by resilience of the first elastic arm 85, the tab member 73 receives a force that pushes it back to the original recordable position when passing the guide surface 79a and receives a force that pushes it toward the unrecordable position as a movement destination when passing the guide surface 79b during the process of moving from the recordable position to the unrecordable position. On the other hand, by the resilience of the first elastic arm 85, the tab member 73 receives a force that pushes it back to the original unrecordable position when passing the guide surface 79b and receives a force that pushes it toward the recordable position as a movement destination when passing the guide surface 79a during the process of moving from the unrecordable position to the recordable position.

According to this embodiment, even when the tab member 73 is moved relative to the cartridge case 2 due to an external force such as a drop impact acting on the disk cartridge 1, for example, the tab member 73 can be brought back to the recordable position or the unrecordable position by an operation of the guide surface 79a or the guide surface 79b of the bump 79. Moreover, a situation where the tab member 73 stops between the recordable position and the unrecordable position can be suppressed. Therefore, it becomes possible to enhance detection accuracy on whether recording is possible and secure a reliability of the unintentional deletion prevention mechanism of the disk cartridge 1.

Further, according to this embodiment, since the bump 79 having the above structure is formed between the recordable position and the unrecordable position of the tab member 73, the tab member 73 can be smoothly moved from the recordable position to the unrecordable position or from the unrecordable position to the recordable position. As a result, operability of the tab member 73 can be improved.

Furthermore, since the guide surfaces 79a and 79b are formed continuously, the tab member 73 can be prevented from stopping at the boundary portion between those surfaces. Moreover, since the boundary portion between the guide surfaces 79a and 79b is located exactly at an intermediate position between the recordable position and the unrecordable position, positioning accuracy can be maintained with equivalent stability at the time the tab member 73 is positioned at the recordable position and the time the tab member 73 is positioned at the unrecordable position. In addition, the operational force with respect to the tab member 73 from the recordable position to the unrecordable position and the operational force or operability with respect to the tab member 73 from the unrecordable position to the recordable position can be made equivalent.

In addition, since the guide surfaces 79a and 79b are formed as tilted linear surfaces, the operational force of the tab member 73 can be positively transmitted to the user to thus contribute to an improvement in operability.

In the tab member 73, the first elastic arm 85 that comes into contact with the guide surfaces 79a and 79b extends obliquely toward the guide wall 76. With this structure, the elastic arm 85 extends while tilting toward the guide wall 76 side with respect to the slide direction of the tab member 73 in the initial state. As a result, an overhanging amount of the elastic arm 85 in a direction vertical to the movement direction of the tab member 73 at a time the elastic arm 85 is deformed can be reduced.

In this embodiment, a length and inclination angle of the elastic arm 85 are set so that the elastic arm 85 does not protrude outwardly from the base portion 81 of the tab member 73 at a time the elastic arm 85 is maximumly deformed. As a result, the size of the tab accommodation portion 72 can be reduced and a degree of freedom in designing the cartridge case 2 can be enhanced. As the inclination angle of the elastic arm 85, an angle with which the elastic arm 85 and the guide surface 79a become substantially parallel can be used, for example.

Figure 18:
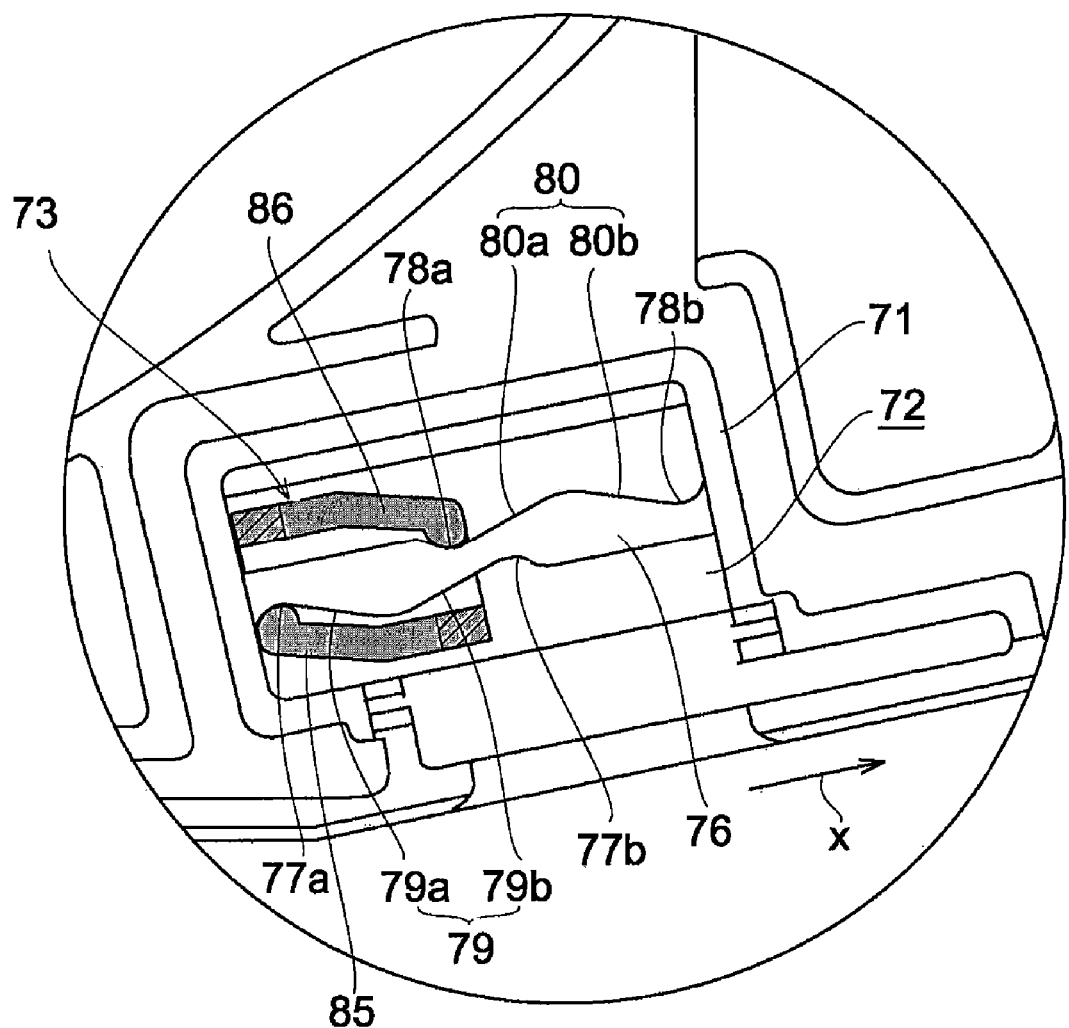
FIG. 18 A plan view showing a main portion of the tab accommodation portion according to a modified example of the embodiment of the present invention.

Although the structure in which the bump 79 that has the first and second guide surfaces is formed on one surface of the guide wall 76 in the tab accommodation portion 72 has been described in the above embodiment, the bump may be formed on at least one surface of the guide wall. FIG. 18 shows a structure in which bumps are formed on both surfaces.

In FIG. 18, a bump 80 is formed between the second recordable-position concave engagement portion 78a and the second unrecordable-position concave engagement portion 78b. When the tab member 73 is slid from the recordable position of the tab member 73 shown in the figure in an X direction indicated by the arrow and moved to the unrecordable position, a guide surface 80a functions as a first guide surface for gradually increasing the elastic force of the elastic arm 86 in accordance with the movement of the tab member 73, and a guide surface 80b functions as the second guide surface for gradually decreasing the elastic force of the elastic arm 86 in accordance with the movement of the tab member 73. Accordingly, a positioning stability of the tab member 73 at the recordable position or the unrecordable position by the elastic arms 85 and 86 can be enhanced, with the result that the tab member 73 can be positively prevented from stopping while moving between those two positions.

Moreover, although the guide surfaces 79a and 79b constituting the bump 79 have been structured as flat linear surfaces in the above embodiment, the guide surfaces 79a and 79b may instead be structured as curved surface having a predetermined curvature. In addition, the embodiment is not limited to the example in which the boundary portion between the guide surfaces 79a and 79b is positioned at an intermediate position between the recordable position and the unrecordable position, and the boundary portion may be formed at a position more on the recordable position side or the unrecordable position side.

Furthermore, in the unintentional deletion prevention mechanism 70, a display member 90 may be provided between the tab accommodation portion 72 and the operation hole 75 as shown in FIG. 15. The display member 90 is substantially rectangular and accommodated in an accommodation groove 91 formed between the tab accommodation portion 72 and the operation hole 75. The display member 90 is invisible from the outside since it is covered by the operation piece 83 at the time the tab member 73 is at the recordable position shown in FIG. 15(A) and becomes visible from the outside by the movement of the operation piece 85 at the time the tab member 73 is at the unrecordable position shown in FIG. 15(B). In this regard, by coloring the display member 90 in red or the like or displaying letters "recording" or the like, the user can visually recognize which of the recordable position and the unrecordable position the tab member 73 is at.

The embodiment is not limited to the disk cartridge having the structure described above and is also applicable to an unintentional deletion prevention mechanism of other recording medium cartridges such as a disk cartridge that includes a single shutter member that opens and closes an opening by moving along a side edge of a substantially-rectangular cartridge case and a tape cartridge in which a tape reel around which a magnetic tape is wound is rotatably accommodated inside a cartridge case.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A recording medium cartridge comprising:
a cartridge case;
a recording medium accommodated inside the cartridge case;
a tab member that is movable between a recordable position at which information can be recorded onto the recording medium and an unrecordable position at which the information cannot be recorded, the tab member including an elastic arm that elastically comes into contact with the cartridge case; and
a guide portion that is formed on the cartridge case and includes a first guide surface that gradually increases an elastic force of the elastic arm in accordance with a movement of the tab member between the recordable position and the unrecordable position, and a second guide surface that gradually decreases the elastic force of the elastic arm, the first guide surface and the second guide surface being formed continuously.

2. The recording medium cartridge according to claim 1, wherein the elastic arm includes, at a tip end portion thereof, a convex engagement portion that comes into contact with the guide portion, and
wherein the guide portion includes a first concave engagement portion that engages with the convex engagement portion at a time the tab member is at the recordable position and a second concave engagement portion that engages with the convex engagement portion at a time the tab member is at the unrecordable position.

3. The recording medium cartridge according to claim 2, wherein the first guide surface and the second guide surface are each a tilted linear surface, and
wherein the elastic arm obliquely extends toward the guide portion.

4. The recording medium cartridge according to claim 2, wherein the elastic arm of the tab member is provided as a pair, and
wherein the guide portion is interposed between the pair of elastic arms and has the first concave engagement portion, the second concave engagement portion, the first guide surface, and the second guide surface formed on at least one surface thereof.

5. The recording medium cartridge according to claim 1, wherein the guide portion includes, at an intermediate position between the recordable position and the unrecordable position, a boundary portion between the first guide surface and the second guide surface.

6. The recording medium cartridge according to claim 1, wherein the recording medium is a disk-like recording medium, and
wherein the cartridge case includes a first opening that exposes a part of the disk-like recording medium.

7. The recording medium cartridge according to claim 6, further comprising:
an inner rotor that is rotatably supported inside the cartridge case and includes a second opening corresponding to the first opening; and
a shutter that is movable between a closing position at which the first opening is closed and an opening position at which the first opening is opened in accordance with a rotation of the inner rotor.

* * * * *